United States Patent [19]

Hattendorf

[11] 4,075,900
[45] Feb. 28, 1978

[54] TWO-SPEED VIDEO RECORDER

[76] Inventor: Henry John Hattendorf, 262 Santa Paula, Grand Prairie, Tex. 75050

[21] Appl. No.: 676,111

[22] Filed: Apr. 12, 1976

[51] Int. Cl.² .......................... F16H 9/06; B65H 17/22
[52] U.S. Cl. .................................. 74/217 S; 226/178; 360/90
[58] Field of Search .......................... 74/217 S, 217 R; 274/39 A; 226/178, 188; 360/90

[56] References Cited

U.S. PATENT DOCUMENTS

| | | | |
|---|---|---|---|
| 2,484,910 | 10/1949 | Romaine | 74/217 S |
| 2,986,318 | 5/1961 | Tiger | 226/178 |
| 3,507,435 | 4/1970 | Hathaway | 226/188 X |
| 3,661,395 | 5/1972 | Ban | 226/178 X |
| 3,762,229 | 10/1973 | Johnson | 74/217 S |

Primary Examiner—Carlton R. Croyle
Assistant Examiner—Richard E. Gluck
Attorney, Agent, or Firm—Richards, Harris & Medlock

[57] ABSTRACT

The specification discloses a video recorder having two recording speeds. The recorder includes a capstan for moving video tape past a recording head. A drive pulley is rotated at a predetermined drive speed. The pulley is movable between retracted and extended positions and has a small diameter portion and a large diameter portion. A belt engages the drive pulley in order to drive the capstan. A solenoid is provided to move the drive pulley between the retracted and extended positions, such that the belt alternatively engages the small and the large diameter portions in order to vary the speed of the capstan.

4 Claims, 4 Drawing Figures

TWO-SPEED VIDEO RECORDER

FIELD OF THE INVENTION

This invention relates to video recorders, and more particularly relates to a video recorder having multiple recording speeds.

THE PRIOR ART

Video recorders which use magnetic tape cassettes are well known. In such recorders, a magnetic tape is moved past recording and playback heads by capstan drive. The capstan drive is rotated through a pulley and belt drive which is rotated by a drive motor. Previously developed video cassette recorders operate at a single recording speed and are generally limited to one hour of recording on a single tape cassette. Additional recording time is then limited by the length of tape which can be accommodated by a machine. A need has thus arisen for a video recorder which can record for various time intervals and which can provide extended recording time.

SUMMARY OF THE INVENTION

In accordance with the present invention, apparatus is provided for changing the recording speed of a video recorder having a belt driven recording tape. The invention includes a pulley rotatable to drive the belt for driving the recording tape through the video recorder. The pulley includes a narrow diameter portion and a large diameter portion. Structure is provided to selectively engage either of the narrow diameter portion or the large diameter portion with the belt in order to change the drive speed of the belt to vary the recording speed of the video recorder.

In accordance with another aspect of the invention, a video recorder has two recording speeds and includes a capstan for moving video tape past a recording head. A drive pulley is rotated at a predetermined drive speed. The pulley is movable between the retracted and extended positions and has a small diameter portion and a large diameter portion. A belt engages the drive pulley for driving the capstan. Structure is provided to move the drive pulley between the retracted and extended positions such that the drive belt alternatively engages the small and large diameter portions in order to vary the speed of the capstan.

In accordance with a more specific aspect of the invention, speed changing apparatus for connection to a video recorder includes a base portion operable to be rotated. An aperture is formed in the base portion. A pulley has an extension slidably received within the aperture and keyed for rotation within the base portion. The pulley includes a large diameter portion and a small diameter portion. A spring is positioned within the aperture for normally biasing the pulley to an extended position. A solenoid is mounted adjacent the base portion. Structure connects the solenoid with the pulley for selectively extending and retracting the pulley relative to the base portion.

DESCRIPTION OF THE DRAWINGS

For a more detailed explanation of the present invention and for further objects and advantages thereof, reference is now made to the following detailed description taken in conjunction with the accompanying drawings, in which.

DESCRIPTION OF THE PREFERRED EMBODIMENT

Figure 1:
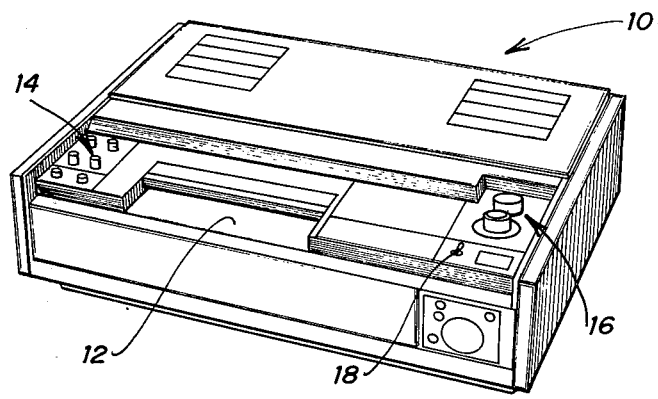
FIG. 1 is a perspective view of a typical video cassette recorder utilizing the present invention.

FIG. 1 illustrates a typical video cassette recorder embodying the present invention. A recorder is identified generally by the numeral 10 and may comprise for example a conventional color video cassette recorder such as the model CR-6300U recorder manufactured and sold by JVC Industries, Inc. of Maspeth, New York. The recorder includes a magnetic tape cassette holder 12 which receives the magnetic tape cassettes and which includes a conventional capstan drive for moving the magnetic tape past a recording and playback head. A plurality of selection and control levers and knobs 14 are provided on the recorder. In addition, channel selection and tuning knobs 16 are also provided.

An important aspect of the recorder 10 is the switch 18 which has two positions to enable the selection of a one hour recording time or a two hour recording time. These recording times may be accomplished with the present invention utilizing the same size tape cassette for both speeds. In the one hour recording time position, the machine operates at the normal recording speed, while when the switch 18 is in the two hour recording time mode, the machine records at a rate one-half that of the normal recording rate. Operation of the switch 18 is all that is required to change the recording speed modes of the machine, with the exception of some minor tuning of the various controls in certain conditions.

Figure 2:
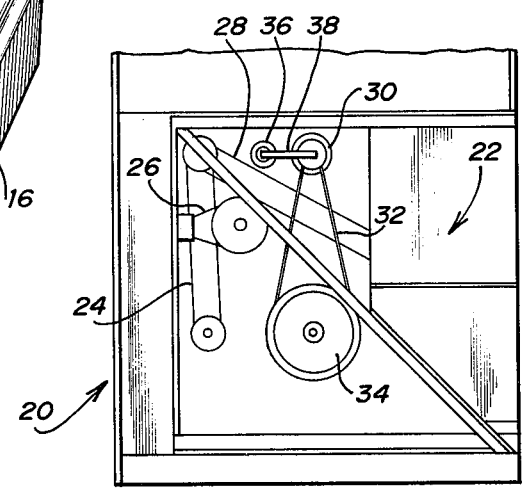
FIG. 2 is a somewhat simplified diagram of the underside of the video cassette recorder shown in FIG. 1.

FIG. 2 illustrates a partially broken away view of the underside of the recorder shown in FIG. 1. The front panel of the recorder is indicated by the numeral 20. Various electronic components for controlling the operation of the device are located on printed circuit boards 22. A large portion of the circuitry and wiring of the unit is omitted in FIG. 2 for clarity of illustration. Various belt drives 24, 26 and 28 are provided to provide various drive functions to the device.

The present invention comprises a pulley assembly 30 which is rotated by a suitable drive motor. The pulley assembly 30 drives a belt 32 which rotates a capstan pulley 34. Pulley 34 rotates to operate the capstan drive which moves the magnetic tape past the recording and playback heads in the conventional manner. The speed at which the capstan pulley 34 rotates determines the speed of movement of the magnetic tape past the recording and playback heads.

A solenoid 36 includes an arm 38 which operates to control the pulley assembly 30 in a manner to be subsequently described in order to enable varying the speed of the belt 32 and thus of the pulley 34.

Figure 3:
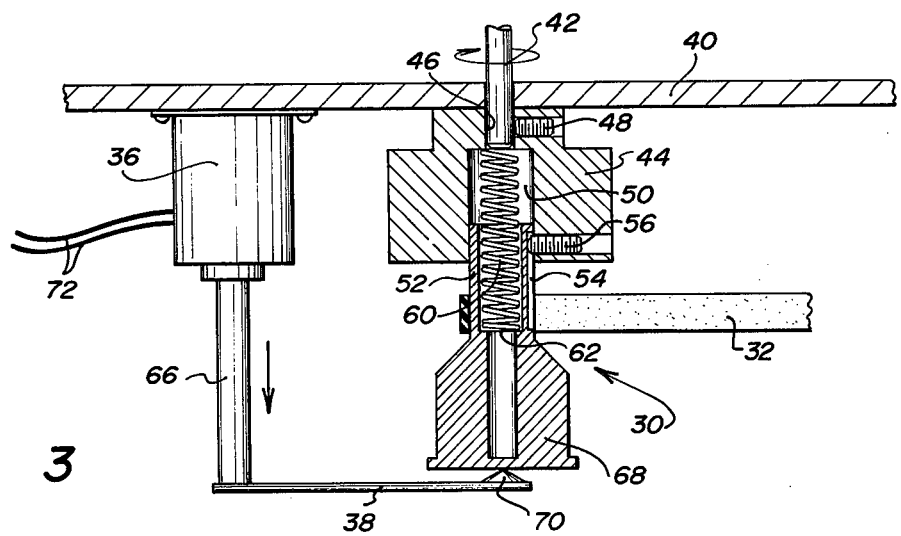
FIG. 3 is a partially sectioned view of the present invention in the slow speed mode.
Figure 4:
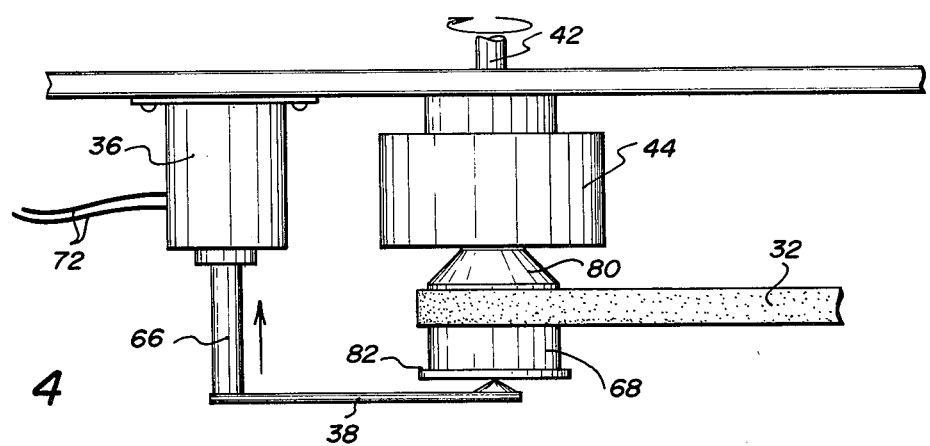
FIG. 4 is a view of the present invention in the fast speed mode.

FIGS. 3 and 4 illustrate in detail the construction and operation of the pulley assembly 30 and of the solenoid 36. The pulley assembly 30 is mounted beneath a plate 40 of the recorder housing. A drive shaft 42 may comprise the conventional drive shaft of the recorder which is rotated by a suitable motor in the known manner. The conventional drive pulley of the recorder is removed, however, and the pulley assembly 30 and solenoid 36 are mounted on the unit in order to provide the advantages of the present invention.

The pulley assembly 30 includes a circular base portion 44 which includes an aperture 46 for receiving the shaft 42. A set screw 48 is threadedly mounted within the base portion 44 and is tightened against the shaft 42 such that the base portion 44 rotates with the shaft 42. A counterbore aperture 50 is formed in the base portion 44 and is dimensioned to receive a circular extension 52. A slot 54 is formed along the length of the extension 52 and a set screw 56 extends from the base portion 44 into the slot 54 in order to key the extension 52 for rotation with the base portion 44. However, the extension 52 is slidable along the aperture 50 relative to the base portion 44.

A spring 60 is disposed within the aperture 50 and extends upwardly into an aperture 62 within the extension 52. Spring 50 thus operates to normally bias the extension 52 in an outwardly extended position. The set screw 56 prevents the extension 52 from being completely withdrawn from the base portion 44.

In the extended position of the pulley assembly 30 shown in FIG. 3, the belt 32 is received by the small diameter extension 52 and the recorder 10 operates at a slow speed to provide a two hour recording time mode. The extended position is provided when the solenoid 36 is deenergized and the solenoid shaft 66 is in the outwardly extended position as illustrated. The arm 38 is connected to shaft 66 and extends over the pulley portion 68 of the pulley assembly 30. A flexible tip 70 is mounted on the arm 38 and bears against the bottom surface of the pulley portion 68 in the manner illustrated. Power may be selectively applied to the solenoid 36 via wires 72 which lead to the switch 18. When switch 18 is in the two hour mode, the circuit to wires 72 is broken and no electrical signals are applied to the solenoid 36.

FIG. 4 illustrates the present invention when operating in the one hour recording mode. In this mode, switch 18 is thrown such that electrical power is applied via lead 72 in order to energize solenoid 36. Solenoid shaft 66 is thus retracted. This causes arm 38 to push the extension 52 inside the base portion 44. The pulley portion 68 is then engaged with the belt 32 in order to drive the pulley 34 (FIG. 2) at a higher rate of speed in order to increase the recording speed of the recorder 10 to the normal one hour recording rate.

A tapered portion 80 may be provided between the pulley portion 68 and the extension 52 to enable the belt 32 to be cammed from the extension 52 to the larger diameter pulley 68. A lip 82 is provided on the pulley 68 to prevent belt 32 from slipping off the end of the pulley 68.

When the solenoid 36 is deenergized, the shaft 66 moves to the extended position and the extension 52 moves from the retracted position shown in FIG. 4 to the extended position shown in FIG. 3. The belt 32 then slips from the large diameter pulley 68 onto the smaller diameter extension 52, thereby changing the recording speed of the device to the two hour mode.

The outer diameter of the pulley 68 corresponds to the diameter of the pulley which is standard on the recorder. The outer diameter of the extension 52 is much smaller than the standard diameter, and thus causes the machine to operate at a much slower speed to provide additional recording time on a standard tape cassette.

It will thus be seen that the present invention provides a device which may be easily installed on conventional magnetic video cassette recorders to increase the flexibility of operation of the recorder to additional recording speeds and recording lengths.

Whereas the present invention has been described with respect to specific embodiments thereto, it will be understood that various changes and modifications will be suggested to one skilled in the art and it is intended to encompass such changes and modifications which fall within the scope of the appended claims.

What is claimed is:

1. Speed changing apparatus for connection to a video recorder comprising:
   a base portion operable to be rotated,
   an aperture formed in said base portion,
   a pulley having an extension slidably received within said aperture but keyed for rotation with said base portion, said pulley having a large diameter portion and a small diameter portion,
   a spring positioned within said aperture for normally biasing said pulley to an extended position,
   a solenoid for being mounted adjacent said base portion, and
   means connecting said solenoid with said pulley for selectively extending and retracting said pulley relative to said base portion.

2. The speed changing apparatus of claim 1 wherein said extension includes a slot along the length thereof, a key member extending from said base portion into said slot.

3. A video recorder having two recording speeds comprising:
   a capstan pulley for moving video tape past a recording head;
   a drive pulley rotated at a predetermined drive speed, said drive pulley being movable between retracted and extended positions and having a small diameter portion and a large diameter portion;
   said drive pulley further including a base portion rotated at said predetermined drive speed and an extendable pulley portion slidably mounted within said base portion and keyed for rotation with said base portion;
   a belt engaging said drive pulley for driving said capstan pulley; and
   means for moving said drive pulley between said retracted and extended positions such that said belt alternatively engages said small and large diameter portions in order to vary the speed of said capstan pulley.

4. A video recorder having two recording speeds comprising:
   a capstan pulley for moving video tape past a recording head;
   a drive pulley rotated at a predetermined drive speed, said drive pulley being movable between retracted and extended positions and having a small diameter portion and a large diameter portion;
   said drive pulley further including a base portion rotated at said predetermined drive speed and an extendable pulley portion slidably mounted within said base portion and keyed for rotation with said base portion;
   mating apertures formed in said base portion and said extendable pulley portion;
   a spring deposed in said apertures to bias said extendable pulley portion to the extended position;

a belt engaging said drive pulley for driving said capstan pulley; and means for moving said drive pulley between said retracted and extended positions such that said belt alternatively engages said small and large diameter portions in order to vary the speed of said capstan pulley.

* * * * *